Sept. 2, 1924.  1,507,006

F. L. SIMMONS

MAGNETIC CHUCK

Filed Oct. 28, 1918  2 Sheets-Sheet 1

Inventor
Frank L. Simmons
By Attorney
George Ramsey

Sept. 2, 1924.

F. L. SIMMONS 1,507,006

MAGNETIC CHUCK

Filed Oct. 28, 1918

Inventor
Frank L. Simmons
By Attorney
George Ramsey

Patented Sept. 2, 1924.

1,507,006

UNITED STATES PATENT OFFICE.

FRANK L. SIMMONS, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

MAGNETIC CHUCK.

Application filed October 28, 1918. Serial No. 259,939.

*To all whom it may concern:*

Be it known that I, FRANK L. SIMMONS, a citizen of the United States, residing at Woonsocket, in the county of Providence, State of Rhode Island, have invented certain new and useful Improvements in Magnetic Chucks, of which the following is a specification.

This invention relates broadly to electro-magnetic tools and more particularly to a magnetic chuck.

The principal object of the present invention is a magnetic chuck having a face plate comprised of a plurality of longitudinally extending pole pieces co-operating with energizing magnets in such manner that substantially equal amounts of magnetic forces are present between adjacent pole pieces when the magnet is energized by suitable electric current.

A further object of the present invention is a magnetic chuck as specified and wherein one pair of the said pole pieces is provided with a specially formed holding surface between the said poles whereby a plurality of work pieces may be assembled side by side and simultaneously finished by a suitable grinder or other machine tool.

A still further and important object of the present invention is a magnetic chuck face plate formed as specified and wherein the pole pieces are collectively and also individually interlocked by means of non-magnetic interlocking tie piece members.

A still further object of the present invention is a magnetic chuck as specified and wherein the core for the electro-magnet is made up of a plurality of punchings from sheet metal which are tied together by means of non-magnetic tie members whereby the core comprises a laminated unit having individualized pole pieces, and wherein the core is mounted upon non-magnetic supports which separate the core piece from a suitable housing.

A still further and important object of the present invention is a magnetic chuck wherein the face plate pole pieces have their edges embedded in condensite, bakelite, or similar organic compounds, which are non-magnetic in character.

A still further and equally important object of the present invention is a magnetic chuck as specified having certain portions of the face plate raised above other portions thereof and wherein are provided auxiliary members which exactly fit adjacent the raised portions of the face plate to extend upwardly the individual pole pieces in such manner that the face of the chuck may be leveled or may be varied for general or special working pieces.

The present invention possesses other advantageous features, some of which, with the foregoing, will be set forth at length in the following description wherein will be outlined in full that form of the invention which I have selected for illustration in the drawings accompanying and forming a part of the present specification.

In the drawings I have shown only one specific form of my generic invention, but it is to be understood that I do not limit myself to such form, because my invention may be embodied in a multiplicity of forms, each being a species of my said invention. It is also to be understood that by the claims succeeding the description of my invention I desire to cover the invention in whatsoever form it may be embodied.

Figure 1:
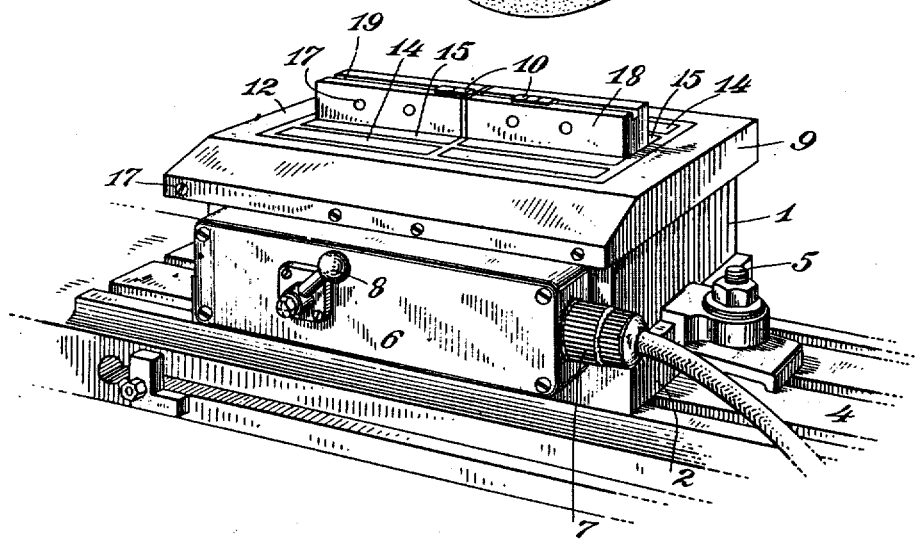
Figure 1 is a perspective view of a preferred form of my invention.

Heretofore in the art of magnetic chucks it has been customary to provide a face plate of a plurality of transversely extending pole pieces or with longitudinally extending pole pieces having irregularly or zig zag-shaped edges, in order to provide relatively long zones of magnetic forces. Such prior art chucks have in most cases been intended for use with work pieces which were of such a size, character, and shape as to overlap a plurality of such magnetic line zones whereby magnetic lines entering the work-piece would be sufficient to securely hold the same in position on the work face. Such prior art magnetic chucks have not been well adapted for holding small workpieces, which at the most are capable of lapping only one magnetic field.

The present invention overcomes the difficulties of the known prior art by providing pole pieces having substantially straight edges which extend longitudinally of the chuck and across which pieces are adapted to be held in such manner that a machine tool, such as a grinder, may be passed lengthwise of a row of such parts, and with the full assurance that the parts will be accurately and securely held in position during the grinding operation.

It has also heretofore been the custom to form the cores for the energizing magnets of magnetic chucks of cast pole pieces in such manner that a single core piece co-operated with a plurality of pole pieces. In such constructions there is a considerable loss of magnetic force and the present invention overcomes the difficulties of the known art in this respect by providing a laminated core piece each individual lamination of which is constructed with a projection adapted to be energized and to co-operate with a single face plate pole piece, and the pieces of all such projections are common so that the magnetic forces are equally distributed between the face plate pole pieces.

Furthermore in the magnetic chuck art it has been customary heretofore to support the edges of the pole pieces in lead or babbett metal in order to provide a non-magnetic medium between the face plate pole pieces. Under certain conditions there is a tendency for particles of emery, carborundum, or similar abrasives, to become embedded in the surface of such soft metals and in certain work such a condition is undesirable. In order to obviate this difficulty and to provide an efficient and cheap support for the face plate pole pieces, I have found that bakelite, condensite, or the like, may be successfully and efficiently utilized for supporting and separating the face plate pole pieces, and that by use of such material the foregoing specified difficulties are overcome.

Referring now more particularly to the drawings wherein are illustrated a preferred form of the chuck, the present invention may be embodied in a housing 1, which may be provided with end ledges 2, whereby the chuck may be clamped to the bed 4, of a suitable machine tool, by means of clamp bolts 5. The front of the housing may carry a suitable switch 6, adapted to co-operate with a connector plug 7, and being provided with a suitable switch control handle 8. The top of the housing carries a face plate 9, which is so positioned as to support work pieces 10 beneath the head of the machine tool, as for example the grinding wheel 11.

Figure 2:
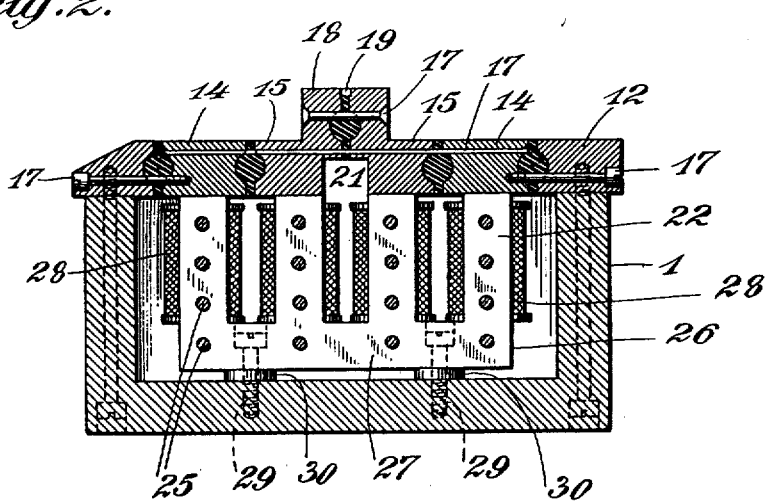
Figure 2 is a sectional view taken on line A—A, Figure 3.
Figure 3:
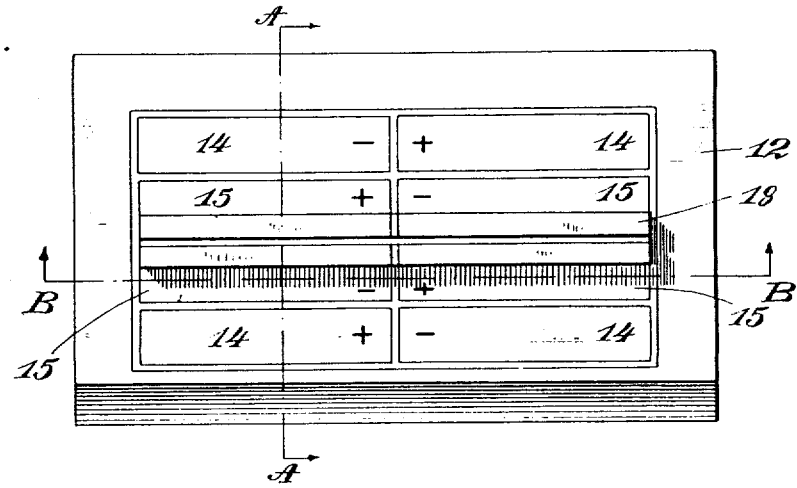
Figure 3 is a plan view of my invention.
Figure 4:
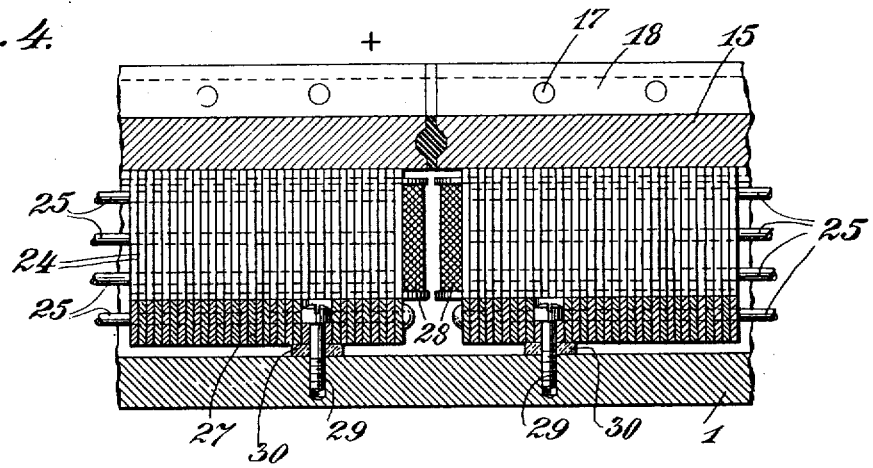
Figure 4 is a view taken on line B—B, Figure 3.

Referring now more particularly to Figures 2, 3, and 4, it will be noted the face plate 9 comprises a frame 12, in which are mounted a plurality of pole pieces 14 and 15. These pole pieces are separated one from another by layers of non-magnetic material which may comprise bakelite, condensite, or other non-magnetic material. Preferably the side walls of the pole pieces are grooved as at 16, to form a relatively large pocket for the non-magnetic material between the pole pieces. This pocket has two functions; first, that of tending to interlock the pole pieces one with another, and second, the function of providing a reservoir in which the non-magnetic material accumulates when the face plate is being made; and where the non-magnetic material is of such character as to tend to expand slightly when changing from a plastic or molten condition to a solid condition, the said material in the reservoir expands and tending to escape outwardly establishes a very tight joint between the several pole pieces. Preferably transverse tying members of non-magnetic material such as brass or the like, and comprising machine screws 17 or similar constructions, may be used to tie the pole pieces together transversely, so that a very rigid face plate construction is obtained. The pole pieces 15 in the present embodiment are shown as being provided with upward expansions 18, and with groove 19 provided between the expansions 18 in such manner as to support the work pieces 10 with the sides thereof to be finished arranged in the path of the grinding wheel 11. Directly beneath the groove 19 the pole pieces 15 are under-cut as at 21 in order that the side area of the pole pieces 15 will be substantially the same as the side area of other pole pieces thereby contributing to providing substantially uniform magnetic fields between all the pole pieces, as will hereinafter be explained.

The energizing means for the pole pieces comprises a core-piece 22, which is made up of a number of sheets or laminations 24 which are riveted together by the tie pieces or rivets 25. Each lamination 24, in the present case, is substantially E-shaped and when secured together these laminations form up-standing core pole pieces 26, one of which extends beneath each of the work face pole pieces. These core pole pieces are all united by common base member 27, which forms a part of the magnetic circuit so that in all cases the portion of the magnetic circuit extending through the core member is uniform for each group of adjacent pole pieces. Since the side areas of the work face pole pieces are substantially the same in all cases, it follows that the magnetic field between each of the pole pieces at the face of the face plate, is substantially the same throughout the entire field of the face plate. Each core pole piece 26 carries an insulated wire coil 28 constructed in such manner as to properly magnetize the said core pole piece when the said coil is energized by a suitable electric current. Preferably the core pieces and coils are constructed as units from which chucks of different lengths may be made by assembling a plurality of these units in a proper housing covered by a proper face plate. In Figures 2 and 4 it will be noted that two sets of these energizing units are used. Where a plurality of such units are assembled it is desirable that the coils be so connected that the pole pieces extending end to end will be of different magnetic signs as is indicated in Figs. 3 and 4. The core pieces 22 may be drilled to receive machine screws 29 which anchor the core pieces to the housing 1. The base of the core pieces are separated from the housing by non-magnetic supports 30, and preferably the machine screws 29 are also made of non-magnetic material, so that when the chuck is in operation the housing 1 and the frame 12 of the face plate are not magnetized. This fact causes the magnetic forces to be concentrated over the pole pieces in the work face and obviates leakage of magnetic forces by avoiding shunt circuits being established through the machine tool on which the chuck is mounted.

Figure 5:
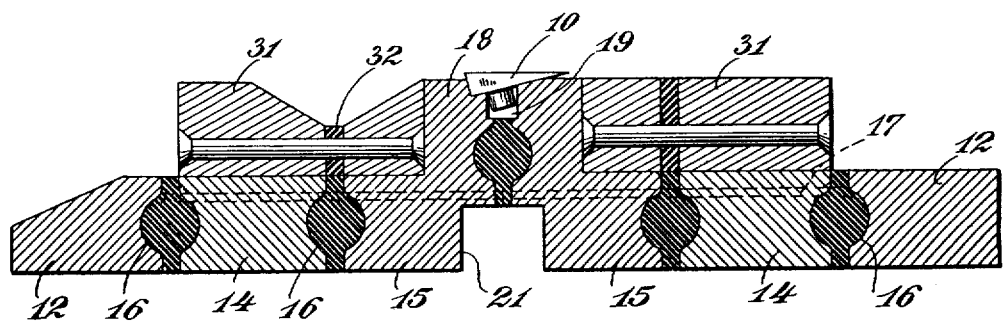
Figure 5 is a sectional view showing the face plate as built up by auxiliary face plate bars.

Referring to Fig. 5 it will be noted that auxiliary face plate members are provided which are constructed to be laid in position on the face plate in such manner that the pole pieces 31 in the auxiliary members exactly overlie the poles in the face plate. Preferably these auxiliary devices are so constructed as to cooperate with the side walls 18 of the upwardly extending pole pieces which insures the position of the auxiliary pole pieces 31 directly over the work face pole pieces, and also provides positive abutments which securely maintains these auxiliary members in position. The auxiliary members are especially adapted to be cut or shaped for holding special work so that the user of the chuck may shape the auxiliary plates by cutting out, as at 32, or by otherwise shaping these members without in any manner destroying or injuring the chuck proper. I am aware that separate, or separable face plates have been proposed. The auxiliary members however are not face plates, but are extension pole pieces adapted to be shaped by the user to suit his especial or individual needs.

Having described my invention what I claim is:—

1. A magnetic chuck comprising in combination a housing, a face plate adapted to rest upon and enclose said housing, said face plate comprising a frame, a plurality of pole pieces within said frame, non-magnetic material separating said pole pieces one from another and from said frame, said pole pieces extending longitudinally of said frame and having substantially straight edges adjacent the work face, non-magnetic tie members extending transversely through said pole pieces to tie the face plate members together, a laminated core piece being provided with upstanding core pole pieces in contact with the face plate pole pieces whereby each face plate pole piece is provided with a corresponding core pole piece, a common back connecting all of the core pole pieces, energizing coils for said core pole pieces, non-magnetic supports between said core piece and said housing, and means for anchoring said core piece to said housing.

2. A magnet chuck comprising in combination a housing, a face plate supported upon and covering said housing, said face plate comprising a frame, a plurality of longitudinally extending pole pieces mounted within and carried by said frame, said pole pieces having substantially straight edges adjacent the work face whereby the work faces of the pole pieces are substantially rectangular, non-magnetic tie pieces extending transversely of said pole pieces, and electro-magnet means within said housing and adapted when suitably energized to magnetize pole pieces.

3. A magnetic chuck comprising in combination a housing, a face plate forming the cover for said housing, said face plate comprising a frame, a plurality of pole pieces within said frame, certain of said pole pieces extending upwardly to form a rib integral with said face plate, non-magnetic material separating said pole pieces one from another and from said frame, and means for energizing said pole pieces.

4. A magnetic chuck comprising in combination a housing, a face plate resting upon and covering said housing, said face plate comprising a frame adapted to rest upon the side walls of said housing, a plurality of longitudinally extending pole pieces within said frame, non-magnetic material separating said pole pieces one from another and from said frame, certain of said pole pieces being provided with upward extensions forming a longitudinally extending rib on the work face of said face plate and with the under portion of said poles cut away beneath said rib, and means for energizing said pole pieces.

5. As an article of manufacture a face plate for magnetic chucks and the like comprising in combination a frame, a plurality of pole pieces mounted in said frame, a phenol condensation product separating said pole pieces one from another and from said frame.

6. As an article of manufacture a face plate for magnetic chucks and the like comprising a frame, a plurality of pole pieces mounted in said frame, the side edges of said pole pieces being recessed to provide pockets between said pole pieces when the pole pieces are arranged within said frame, and means comprising a body of heat hardened resinous condensation product separating said poles one from another and from said frame, and non-magnetic tie pieces extending transversely through said pole pieces to securely maintain the parts connected as a unit.

7. As an article of manufacture a face plate for magnetic chucks and the like comprising a frame, a plurality of pole pieces within said frame, a condensation product of phenol separating said pole pieces one from another and from said frame, and non-magnetic tie pieces joining adjacent pole pieces one with another.

8. As an article of manufacture a face plate for magnetic chucks and the like comprising in combination a frame, a plurality of pole pieces mounted in said frame, non-magnetic material separating said pole pieces one from another and from said frame, and non-magnetic transversely supporting means comprising machine screws extending through the frame and being tapped into the adjacent pole piece.

9. A magnetic chuck comprising in combination a suitable housing, energizing means mounted within said housing, a face plate supported by said housing enclosing the same, said face plate being provided with a longitudinally extending rib, in combination with pole piece extensions adapted to abut the side of said rib and to provide longitudinally extending pole pieces adapted to exactly conform to the pole pieces in the face plate whereby said members comprise extensions of said work face pole pieces and whereby said members may be shaped for special work without destroying the face plate pole pieces.

10. In a magnetic chuck or the like the combination of a suitable housing, energizing means mounted within said housing, a face plate adapted to set upon and enclose said housing, said face plate being provided with a plurality of magnetizable pole pieces, means within said housing for energizing said pole pieces, a longitudinally extending rib on the face of said face plate, in combination with a bar comprising magnetizable members adapted to conform to the pole pieces in the face plate and also adapted to engage the sides of said rib, whereby said members comprise extensions of said pole pieces, which extensions may be shaped as desired for holding special work without destroying the work face pole pieces.

11. A magnetic chuck comprising in combination a housing, a face plate for closing said housing, energizing means within said housing so that when said energizing means is influenced by a suitable electric current the pole pieces in said face plate will be magnetized, certain of said pole pieces extending upwardly to form a ridge on said face plate, the pole pieces beneath said ridge being recessed and the upper portion of said ridge being grooved to receive work pieces, substantially as specified.

12. A magnetic chuck comprising a suitable housing, a face plate mounted on said housing said face plate being provided with a plurality of pole pieces, non-magnetic material separating said pole pieces one from another, certain of said pole pieces extending upwardly to provide a rib on the work face of said face plate, said pole pieces being provided with a groove beneath the adjacent edges of the pole pieces forming the rib, the faces of said upwardly extending pole pieces being also grooved to hold a plurality of work pieces, substantially as specified.

13. A magnetic chuck comprising in combination a housing, a plurality of face plate pole pieces, and a hardened non-metallic non-magnetic material between adjacent pole pieces and comprising the edge supports for said pole pieces.

14. As an article of manufacture, a face plate for a magnetic chuck comprising a plurality of metallic magnetizable pole pieces, and non-metallic, non-magnetizable material separating said pole pieces one from another whereby the work face of said face plate comprises but one metallic substance.

FRANK L. SIMMONS.